Oct. 18, 1966   M. DE WITTE, JR   3,279,875
MODULAR-TYPE INSTRUMENT CASES
Filed Aug. 12, 1964   2 Sheets-Sheet 1
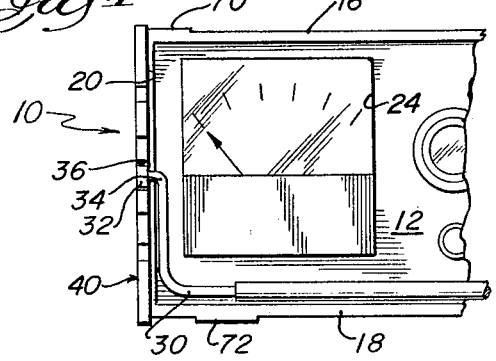
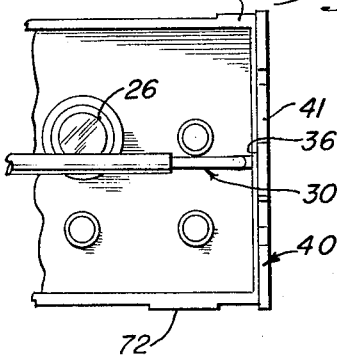
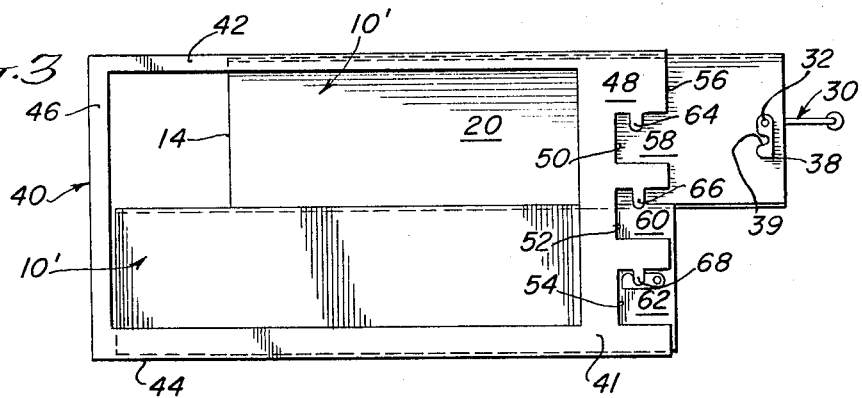
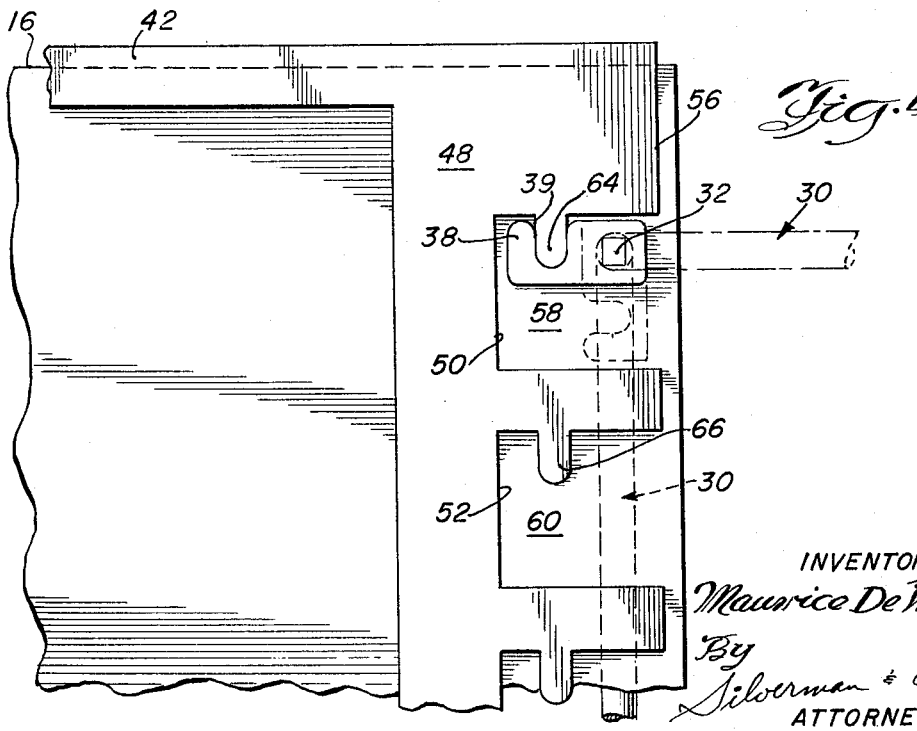
INVENTOR.
Maurice De Witte Jr.
By
Silverman & Cass
ATTORNEYS.

Oct. 18, 1966    M. DE WITTE, JR    3,279,875
MODULAR-TYPE INSTRUMENT CASES
Filed Aug. 12, 1964    2 Sheets-Sheet 2

INVENTOR.
Maurice DeWitte, Jr.
BY Silverman & Cass
ATTORNEYS

United States Patent Office 3,279,875
Patented Oct. 18, 1966

3,279,875
MODULAR-TYPE INSTRUMENT CASES
Maurice De Witte, Jr., Box 296, Shabbona, Ill.
Filed Aug. 12, 1964, Ser. No. 389,170
12 Claims. (Cl. 312—320)

This invention relates generally to instrument cases for so-called "shelf-racked" use and more particularly, to a modular-type instrument case of the character described having a novel combined handle and latch device at an end thereof.

Electronic instruments, measuring instruments, radio equipment and the like apparatus most often are housed in standardized cabinets or cases of generally uniform configuration. In many instances it becomes desirable to employ instruments in groups, interconnected and/or operated in tandem, either mounted upon a laboratory bench or seated within a shelf or rack structure. The instruments often are portable and are adapted to be carried from one location to another for set-up as the operator requires. Such apparatus normally includes fragile elements usually requiring delicate and sensitive adjustments for calibration and use. The instruments also are expensive to repair and/or replace.

In instances where a larger number of instruments are employed, it becomes advantageous to arrange these instruments in a stack, one upon the other, in vertical and/or horizontal rows. In some instances, prefabricated rack structures, including shelves, are provided. Often the instruments are merely disposed case upon case. Whether the instruments are stacked or racked, the cases tend to slide out of the stacked array. Substantial difficulty has been encountered in maintaining adjacent cases properly aligned. Thus there is danger of damage to the delicate balance of the instrument with attendant reduction in the accuracy and precision of the resultant measurements. There is also the possibility of serious damage to the instrument occurring should the stacked structure collapse. If one of the instruments is removed and replaced in the stacked array, sliding of same therefrom often causes the next adjacent instrument also to slide. A similar result occurs even when the instruments are seated upon a prefabricated rack structure.

Accordingly, it is the principal object of this invention to provide instrument cases which are capable of being stacked in horizontal and/or vertical rows, either one upon the other or in prefabricated racks, said cases having novel latch means associated therewith to prevent undesired sliding of adjacent cases from the stacked array in the direction of the length thereof.

Another object of the invention is to provide an instrument case having a combined carrying handle and latch means, said latch means rotatable with the handle for securing adjacent cases in a stacked array against relative sliding movement along the longitudinal axis thereof, but releasable to permit withdrawal of a selected instrument from the stack.

A further object of the invention is to provide a combined carrying handle and latch means for an instrument case and catch means associated with said instrument case, said latch means and said catch means being cooperably engageable for holding adjacent cases in alignment in a stacked array, said latch means being releasable to permit selected withdrawal of an instrument case from the stack when the handle is rotated to carrying position.

An additional object of the invention is to provide an instrument case having a selectively operable latch disposed at least upon one side wall of said case and a rail adaptor member adapted to be interposed between adjacent cases having catch means provided therein aligned with said latch, said catch means comprising at least one socket portion having a protrusion extending therein and the latch is selectively engageable with the protrusion to hold the case in racked position but selectively relasable to permit sliding of the instrument from the stack.

Other objects of the invention are to provide instrument cases of sturdy construction which are easily and economically fabricated; which permit of maximum versatility in arrangement of the cases; and which are capable of easy set-up and knockdown without risk of damage to the instruments.

Still other objects and advantages of the invention will become evident to the skilled artisan as a preferred embodiment of the invention is described in detail hereinafter with reference to the accompanying drawings.

In the drawings:

FIG. 1 is a fragmentary front elevational view of an instrument case according to the invention illustrating the combined carrying handle and latch means thereof in engaged condition.

FIG. 2 is a fragmentary front elevational view of the instrument case of FIG. 1 illustrating the combined carrying handle and latch means thereof in carrying condition.

FIG. 3 is a side elevational view of a pair of instrument case arranged in stacked array, the upper case being shown partially withdrawn from the array and the lower case illustrated locked in the array.

FIG. 4 is an enlarged fragmentary side elevational view of the case illustrated in FIG. 1, with the handle and associated latch means shown in phantom lines in the carrying condition and in solid lines in engaged condition.

Figure 5:
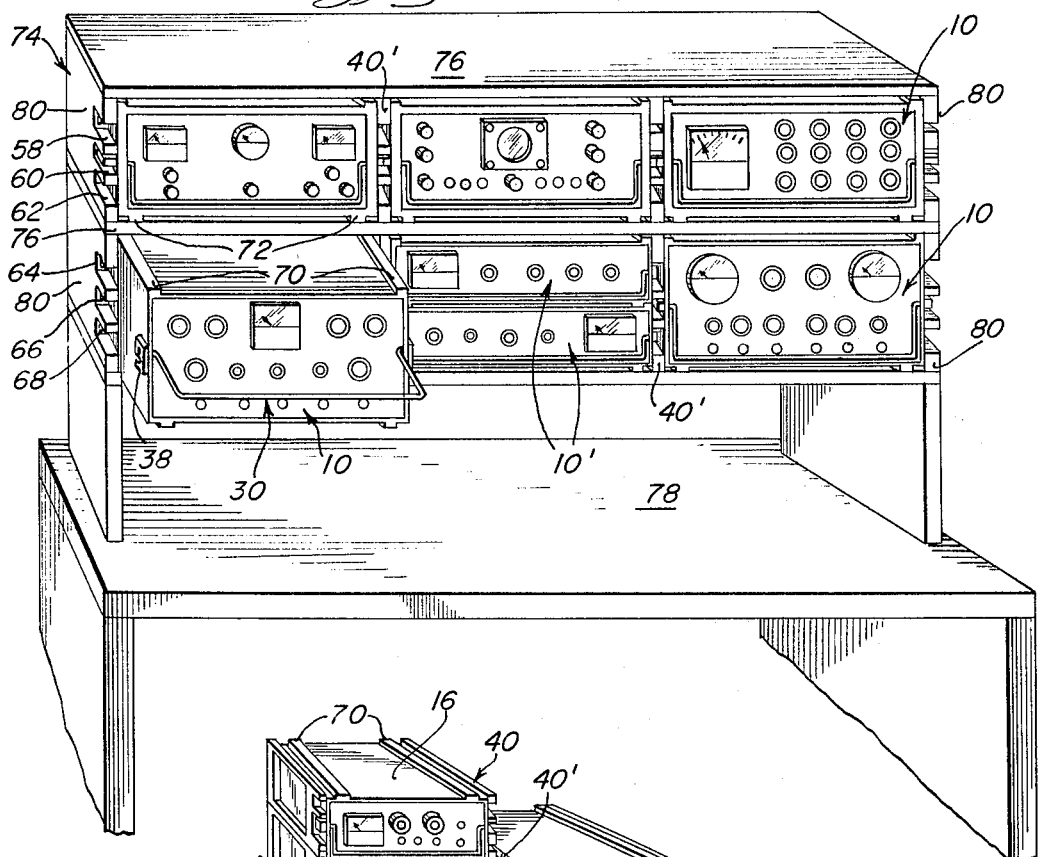
FIG. 5 is a perspective view of a plurality of instrument cases according to the invention arranged seated within a prefabricated rack mounted upon a laboratory bench, one of the cases illustrated in partially withdrawn position.

Referring now to the drawings, the instrument case according to the invention is designated generally by refrence character 10. The case 10 is of box-like configuration of generally rectangular cross section and has a front wall 12, a rear wall 14, a top wall 16, a bottom wall 18 and a pair of opposite side walls 20 and 22. The electronic or electromechanical apparatus comprising the instrument proper is encased within the enclosure defined by the case 10. The front wall or face 12 preferably is recessed from the front end of the case 10 and has windows 24, dials 26 and various other knobs and switches common to such an instrument.

A handle or wire bail 30 is provided for carrying the case 10. The handle 30 is substantially U-shaped and the free ends 32 thereof are turned or bent outwardly as at 34 for passage through suitable aligned openings 36 which are provided in the opposite side walls 20 and 22. The carrying handle 30 is rotatable between the carrying position illustrated in FIG. 2 and the recessed position as shown in FIG. 1. Latch means such as latch member 38 is mounted upon at least one of the free ends 32 of the handle 30 and is rotatable with said handle.

Rack adaptor means 40 may be arranged adjacent at least one of the side walls 20 and 22 of the case 10. The rack adaptor means may be formed of wood or metal and comprises a relatively thin, rectangular open frame 41 comprising top and bottom rails 42 and 44 and front and rear rails 46 and 48. The front rail 48 is provided with aligned spaced cut-out portions 50, 52 and 54 formed therein, each opening to one edge 56 of the front rail to define catch means comprising sockets 58, 60 and 62 having protrusions or lugs 64, 66 and 68 extending therein. The latch member 38 is relatively flat and has a recess 39 provided adjacent one end thereof. The protrusions 64, 66 and 68 are chosen to be complementary in configuration to the recess 39. The size of the sockets is chosen so that the latch member 38 may be rotated within a selected one of the sockets, the respective protrusion engaging within the recess 39. The rack adaptor means 40 may also comprise the side wall of a prefabricated rack such as shown in FIG. 5. The invention also contemplates instances where one of the side walls of the case may be formed in the configuration of the rack adaptor means 40, having the aforementioned sockets formed therein opening to the front edge of said wall. In such examples, the latch 38 will be disposed adjacent the opposite side wall of the case.

The latch member 38 fixedly is mounted on the handle end 32 so that when the case 10 is aligned with the front edge 56 of the rack adaptor 41, the latch 38 is disposed within one of the sockets 58, 60 or 62, depending upon the height of the case 10. When the handle 30 is released from its carrying position and rotated to rest adjacent face 12, the latch 38 is rotated within the said selected socket to engage the respective lug in recess 39.

In the embodiments described and shown herein, the rack adaptor 41 is provided with three aligned sockets. The aligned openings 36 in the opposite side walls 20 and 22 of the case normally are located midway between the corners of the case so as to provide adequate balance for the handle for carrying of the instrument. Thus the latch 38 also is disposed midway between the top and bottom walls of the casing. The three sockets 58, 60 and 62 are located preferably whereby when the height of the case 10 is approximately equal to the height of the rack adaptor 41, the latch 38 thereof would be located aligned for entry into the center disposed socket 60, such as shown in FIGS. 1 and 2. Where the height of the case, such as case 10' illustrated in FIGS. 3 and 4, is approximately equal to one-half the height of the case 10, the latch 38 of cases 10' may be aligned for engagement within either socket 58 or 62 depending upon which of the cases 10' is the upper one of the pair.

Figure 6:
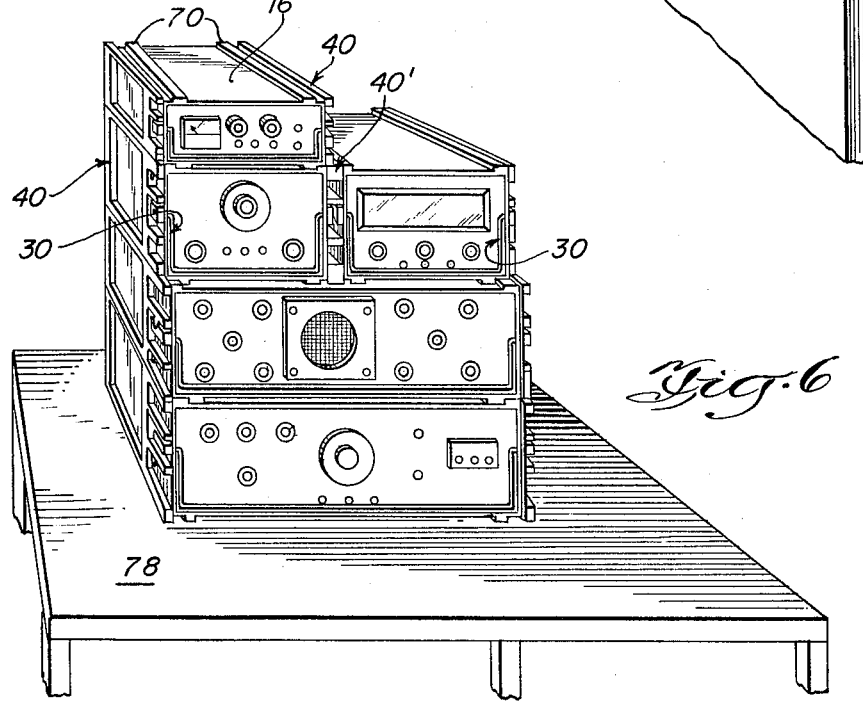
FIG. 6 is a perspective view of a plurality of instrument cases according to the invention arranged in stacks one upon the other to illustrate a different array possible with use of the invention.

Top and bottom walls 16 and 18 of cases 10 or 10' may be provided with slightly raised rail pairs 70 and 72 respectively along the length thereof. At least one rail pair, such as pair 72, is spaced inwardly of the lateral edge of wall 18 at least a distance equal to the width of each rail of the pair 70, with the rail pair 70 being disposed adjacent to the respective lateral edges of wall 16. Thus, when the cases are stacked one upon the other, as shown in FIGS. 3 and 6, the rail pairs 70 and 72 are nested and act as guide means for relative movement of the cases in the direction of the length thereof. Relative lateral movements also are prevented by the rail pairs. A similar function is performed by said rail pairs when the cases are seated in a prefabricated rack structure 74 as shown in FIG. 5.

In FIG. 5, a group of instruments encased in cases 10 and 10' are shown arranged upon the shelves 76 of a prefabricated rack structure 74. The rack structure 74 is shown resting upon a laboratory bench 78 which permits selective withdrawal of a lower disposed one of the bank of instruments without disturbing the arrangement of the remaining instruments. Note that the different height cases 10 and 10' may be racked side by side with the respective combined carrying handle and latch means engaged in respective sockets of rail adaption means 40.

FIG. 6 illustrates another arrangement made possible by utilizing the invention. Here several instruments are stacked one upon the other, with the rack adaptor means 40 and 40' arranged adjacent the instrument cases.

Other types of latching means may be utilized with equal advantage. Other types of guide means also may be used in place of guide rail pairs 70 and 72. Likewise, the number and combinations of instruments which are possible utilizing the invention are believed more numerous than illustrated herein.

I claim:

1. A stacking instrument case of substantially rectangular cross section for stacking in adjacent rows of similar cases, carrying handle means rotatably secured to each case, latch means mounted to said handle means and rotatable therewith, and catch means disposed for engagement with the latch means of a next adjacent case to secure said cases against slidable movement one relative to the other, said catch means being formed in a wall structure adapted to be disposed adjacent the next adjacent case, said catch means comprising a plurality of sockets arranged in vertical rows thereof opening toward the latch means for receiving the latch means of a single, next adjacent case depending upon the height of the case, each socket having a lug integral with said wall structure and extending into said socket, said latch means adapted to be rotated within said socket to engage said lock when the carrying handle is disposed next adjacent said case and disengageable from said lug when the carrying handle is rotated outwardly from said case toward its carrying position, and said wall structure comprising a separate frame member disposed adjacent the next adjacent case and having a portion thereof disposed adjacent the latch means, said portion having the said plurality of sockets formed therein.

2. A combined carrying handle and latch means for instrument cases of the stacking type which are arranged in adjacent rows, said combined carrying handle and latch means comprising a substantially U-shaped bail member having the free ends thereof adapted to be rotatably journalled in opposite walls of the case, a latch member mounted to at least one of the free ends for rotation with said handle, a plurality of socket means arranged in a vertical row adjacent to said latch member whereby to accommodate in a selected one thereof the latch member of said handle depending upon the height of the case with which the handle is operatively associated, said socket means including a catch member cooperable with said latch member for locking same within said socket means when the handle is in other than carrying condition and disengageable therefrom when the handle is rotated to be disposed in carrying condition.

3. A stacking instrument case having a carrying handle, latch means mounted to said carrying handle for rotation therewith, and rack adaptor means arranged adjacent said case, said rack adaptor means having a plurality of cut-out portions in vertical rows thereof, each said portion defining a socket, and a lug extending into each said socket, any one of said sockets adapted to receive said latch means of a next adjacent case therein depending upon the height of said case when the case is aligned with other like cases in adjacent rows and said latch means being engageable with said selected lug in said selected socket to lock the case at least against sliding movement in the direction of the length of the case relative the rack adaptor means and other adjacent cases.

4. The structure as claimed in claim 3 in which the socket carrying portion of said rack adaptor means comprises a separate rail member of framelike configuration arranged in vertical disposition between adjacent cases.

5. A modular-type instrument case of substantially rectangular cross section for stacking in adjacent vertical and horizontal rows of similar cases, said instrument case having a pair of opposite side walls and a front wall, carrying handle means disposed in bridging relation to said side walls and journalled for rotation between a rest position adjacent the front wall of said case and a carrying position spaced outwardly from said front wall, and means for locking the said case against sliding movement relative the next adjacent cases in the direction of the length of said cases, said means comprising a front opening socket formation formed in at least one of said side walls having a depending lug formation extending there-into and a latch formation carried on said handle means for rotation therewith, said latch formation of one instrument case being of size and configuration for accommodation entirely within the socket formation within the next adjacent instrument case upon alignment of the respective walls thereof and having a slot formed therein of size and configuration to receive said lug formation of said next adjacent case, the latch formation being capable of being moved into engagement with the said lug formation of said next adjacent instrument case upon movement of the said carrying handle means to its rest position and capable of disengagement to release the next adjacent case when the carrying handle means is disposed in its carrying position.

6. The structure as claimed in claim 5 in which the instrument case has only one socket-carrying side wall and the latch formation is disposed on that portion of the carrying handle journalled on the opposite side wall beyond the side of the case.

7. The structure as claimed in claim 5 in which the socket-carrying portion of said opposite side walls comprises a separate rail member of framelike configuration arranged in vertical disposition adjacent said side wall and said separate member is of a thickness sufficient to permit accommodation of a pair of latch formations arranged side by side within a socket formation thereof.

8. A modular-type instrument case array comprising at least a pair of adjacent instrument cases arranged in a horizontal row, each instrument case being of rectangular configuration and having a pair of opposite side walls and a front wall, and latch means journalled for rotation relative to at least one of said side walls; and, a rail structure including a vertically arranged front wall, said rail structure being disposed between the pair of adjacent instrument cases, at least one front opening socket formed in said front wall of said rail structure having a lug formation extending partway therein, said latch means and said socket being of size and configuration for accommodation of the latch means on one of said pair of adjacent instrument cases entirely within the socket of the other of said pair of adjacent instrument cases upon alignment of said instrument cases, said latch means having a slot therein of size and configuration to receive said lug formation upon rotation of the latch means entirely within the confines of said socket for locking of the instrument cases against relative sliding movement in a lengthwise direction and being disengageable for release of said instrument cases from said array.

9. A structure as claimed in claim 8 in which each of said instrument cases has a handle journalled for rotation between a rest position adjacent the front wall and a carrying position spaced therefrom, said latch means being mounted on said handle for engagement with the lug formation when the handle is in rest position and disengagement when the handle is in carrying position.

10. In combination, for use in arranging a plurality of instrument cases in horizontally and vertically aligned, stacked modular array wherein each of said instrument cases is of substantially rectangular, cross-sectional configuration having opposite side walls and a front wall and a carrying handle journalled for rotation between a rest position adjacent the front wall and a carrying position spaced outwardly of the front wall; latch means mounted on the handle and rotatable therewith, and a rail structure including a front wall portion having at least one front opening socket formed therein, said socket having a lug formation extending partway therein, said rail structure being vertically arranged between horizontally adjacent cases with the socket aligned with the latch means, the socket being formed of a size and configuration sufficient entirely to receive the latch means therein for rotational movement thereof, said latch means having a slot formed therein for receiving the lug formation when the carrying handle is disposed in its rest position and said latch means being releasable from said lug formation when the carrying handle is rotated through its carrying position whereby to insure against sliding movement of the cases one relative to the other in lengthwise direction relative the array but to permit withdrawal of one of said cases from said array without disruption of the remainder of said array.

11. The structure as claimed in claim 10 in which the rail structure is secured to one of said opposite side walls and a latch means is attached to a carrying handle adjacent the other of said opposite side walls and is arranged to engage the lug formation of a rail structure adjacent to said other opposite side wall.

12. The structure as claimed in claim 10 in which said rail structure has its front wall of a thickness sufficient to accommodate the latch means of a pair of horizontally next adjacent cases, said rail structure being disposed therebetween.

References Cited by the Examiner

UNITED STATES PATENTS

| 2,506,844 | 5/1950 | Smith | 312—107 |
| 2,514,246 | 7/1950 | Knox | 317—101 |
| 2,794,155 | 5/1957 | Jones. | |

FOREIGN PATENTS

| 921,395 | 3/1963 | Great Britain. |

CLAUDE A. LE ROY, *Primary Examiner.*

CHANCELLOR E. HARRIS, *Examiner.*

F. DOMOTOR, *Assistant Examiner.*